April 14, 1953     G. AGINS ET AL     2,635,224
CALCULATING INSTRUMENT

Filed Oct. 18, 1946     3 Sheets-Sheet 1

INVENTORS
George Agins
Charles D. Bock
BY
Campbell Brumbaugh & Free
ATTORNEYS

April 14, 1953     G. AGINS ET AL     2,635,224
CALCULATING INSTRUMENT

Filed Oct. 18, 1946     3 Sheets-Sheet 2

INVENTORS
George Agins
Charles D. Bock
BY *Campbell Brumbaugh*
ATTORNEYS

Patented Apr. 14, 1953

2,635,224

UNITED STATES PATENT OFFICE 2,635,224

CALCULATING INSTRUMENT

George Agins, Brooklyn, and Charles D. Bock, New York, N. Y., assignors to Arma Corporation, Brooklyn, N. Y., a corporation of New York Application October 18, 1946, Serial No. 704,164

3 Claims. (Cl. 323—52)

This invention relates to calculating instruments, and has particular reference to precision trigonometric calculators for resolving vectors into components, or combining components into vectors.

Mechanical devices for resolving a length quantity with an angular directional quantity into one or more component length and angular values, as in vector resolution, have long been known, but such mechanisms, unless made very bulky, are decidedly unbalanced, difficult to drive and susceptible to errors induced by the violent accelerations accompanying the explosions in warfare. For this reason electromechanical resolvers, which are inherently balanced and relatively small, are superior to the mechanical types and have been recognized and employed in their elementary forms for certain purposes.

Essentially, an electromechanical resolver comprises a rotor winding which is arranged to be rotated in relation to an alternating current-excited stator winding, so that a voltage will be induced in the rotor winding proportional to the exciting current and sine function of the angle between the windings. If the stator of a small motor of the split-phase type is wound with a single distributed winding to make a pair of magnetic poles precisely opposite each other in the cylindrical gap of the stator, and an armature of slotted iron laminations and similarly wound is mounted for rotation within the stator, a crude but practical resolver is provided for constant low-frequency work.

However, such a resolver develops serious faults when attempt is made to use it for accurate calculation, because, since the answer value is produced in the rotor winding by induction from the stator winding, energy losses are encountered which causes phase shift in the output circuits of the resolver. Such shift can be easily compensated for any definite frequency of alternating current supply and any given value of voltage but, as is usually the case on ship-board, a shift of ±10% may be encountered in frequency value and a 200 to 1 change in voltage is required for certain calculating work, which complicates the problem considerably. In other words, for a small voltage value on the stator winding, one set of conditions obtains, whereas for greater values of stator voltage other conditions obtain and when, as in precision calculation work, the voltage value input to the stator winding may vary as much as two-hundred to one, compensation by known means has not proven practicable.

Also, the effect of high temperature on the windings must be taken into consideration and compensated since heat affects the aforementioned losses. Accordingly, these various error factors have caused the ratio from stator to rotor to undergo unpredictable changes with progression of the problem, so that because of its inherent defects, electromagnetic resolvers have not been used to any extent where accuracy is of prime importance, as it is in projectile firing equipment.

In accordance with the present invention, electromechanical calculating systems and instruments are provided wherein the advantages of inherent balance, ruggedness and compactness of the constant low frequency resolver system are retained, but which are simply and accurately compensated for the usual types of error so that a high degree of precision is maintained at all times in all of the mathematical functions involved in service, whether used for trigonometric computation or vector analysis.

A preferred embodiment of the electromechanical calculating system of this invention comprises a stator and a rotor rotatable therein and each having windings, a source of input for the stator winding supplied by an electronic amplifier having an output coil and an input grid, and a phase-shift compensator. The output coil of the amplifier is connected to the stator winding through a series impedance, and the input grid is fed by the difference between the voltage of the amplifier output coil and the signal input voltage to the calculating system, to which difference voltage is added the output voltage of the phase-shift compensator. The amplifier supplies the required current to the stator winding, under the influence of the input grid voltage, to provide the proper rotor output voltage without drawing current from the calculating system signal input, which thereby eliminates the inherent errors caused by load input circuits. The phase-shift compensator repeats at a suitable ratio the voltage across the series impedance, to correct the phase-shift and non-linearity of the stator, and thereby maintain precisely the desired rotor output voltage. The output voltage of the rotor therefore is proportional to the product of the signal input voltage to the calculating system and a trigonometric function of the angle through which the rotor is angularly displaced from its defined zero position. The mechanical construction of the stator and rotor is also novel and important to the accuracy of the calculation, and each comprises a stack of easily-deformable, high permeability, high-resistivity, low hysteresis-loss steel laminations clamped between substantially non-deformable low-permeability, high-resistivity low-magnetic steel end plates, these laminations having slots for windings having at least two coils per pole concentrically arranged about the magnetic pole-pieces, whereby the magnetic axis of the magnetic pole is maintained substantially fixed with reference to the mechanical axis of the pole-piece for all values of electrical potential applied to the coils.

It will be seen that the electromechanical calculation system of this invention is so thoroughly compensated for types of error that high precision is maintained at all times in the mathematical functions involved, and that a practical, rugged and reliable trigonometric calculation or vector-analysis system is provided.

For a more complete understanding of the invention, reference may be had to the accompanying drawings, in which.

Figure 1:
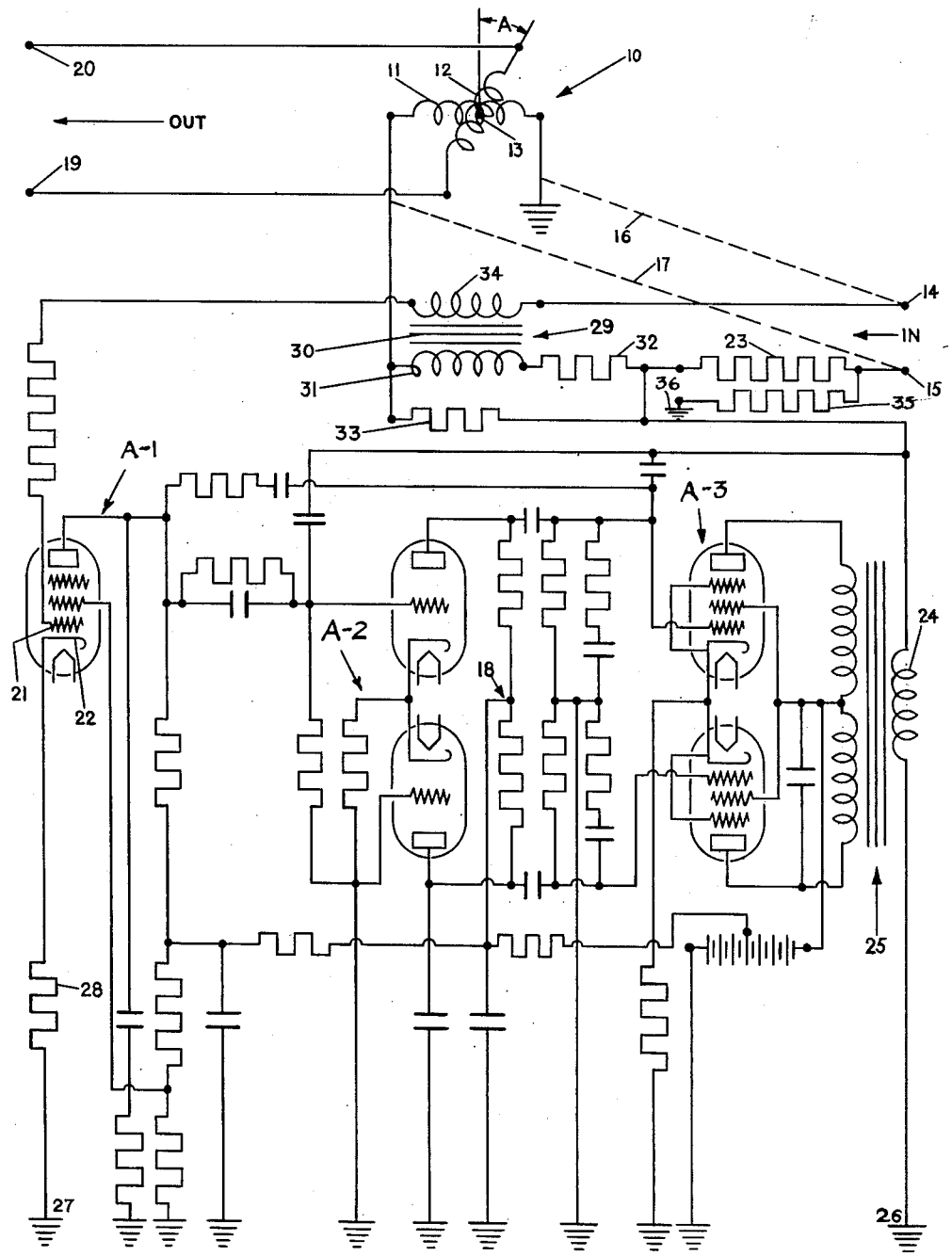
Figure 1 is a schematic electrical diagram of a preferred form of the invention arranged to operate in an electrical calculating circuit.

Referring to Fig. 1, numeral 10 indicates diagrammatically a trigonometric resolver in which the winding 11 represents the stator and the winding 12 represents the rotor, which is rotatable relatively to the stator 11 about the center 13 to any angle A. Input of a variable alternating current voltage value as a modulation of a carrier frequency, representing a variable length, is to be applied at the input terminals 14, 15, and thence to the stator 11 as though along the dash lines 16, 17 in theory, but actually the input is fed through the complex network of the amplifier 18 for reasons to be described. The modulated carrier voltage so impressed at 14, 15 is further modulated in the resolver unit 10 by a trigonometric function of the angle A and the resultant double-modulated voltage wave appears at the terminals 19, 20, i. e. the output terminals of the resolver rotor winding 12.

The aforementioned amplifier 18, as shown in the lower part of the diagram of Fig. 1, may be of any type wherein the net voltage amplification is unity and which is capable of supplying power from its output terminals at a voltage strictly proportional to the voltage applied to it. The general type of amplifier shown and having these characteristics is illustrated and described in greater detail in copending application Serial No. 530,589, filed April 12, 1944, by Frederick W. Cunningham now U. S. Patent No. 2,429,124 of October 14, 1947. This amplifier comprises a semi-direct coupled electronic booster amplifier in which the signal voltage is amplified in an initial stage A-1 and supplied to a phase inverter A-2 through a resistance coupling producing two signals 180° out of phase, which are fed through the aforementioned semi-direct coupling to a push-pull amplifier stage A-3. The output of amplifier A-3 is impressed upon the primary winding of output transformer 25, whose secondary voltage is applied across series connected resistors 23 and 35, from which it is fed back to the first amplifier tube A-1 to effect inverse voltage feed-back. The feed-back circuit may be traced from the ungrounded end of resistor 35, through input terminal 15, input terminal 14, secondary winding 34 of transformer 29, grid 21 of tube A-1, cathode 22 of tube A-1, resistor 28, ground 27, and grounded end 36 of resistor 35. Inverse voltage feed-back in the power output stage is employed to lower the output impedance by reducing the plate impedance of the last stage tubes A-3.

With this arrangement, the amplifier 18 shown in Fig. 1 is caused to have approximately a one-to-one ratio with the ability to give relatively large power output by having 100% reversed feed-back from output to input. The signal or demand input applied across the terminals 14, 15 is conducted from the terminal 14 through the secondary winding 34 of a transformer 29, and thence to the input grid 21 of the first amplifying tube A-1 of the amplifier 18.

The corresponding input terminal 15 is connected to the cathode 22 of the first amplifier tube A-1 through the resistance 35, the grounds 36 and 27, and the resistance 28. The resistance 23 acts to control the strong feed-back in order that a slight gain above the strictly one-to-one amplification may be allowed in the amplifier 18 to supply losses in the resolver 10, thus establishing the ratio through the whole system at exactly one-to-one value, so that the scale of the calculations is maintained.

Figure 2:
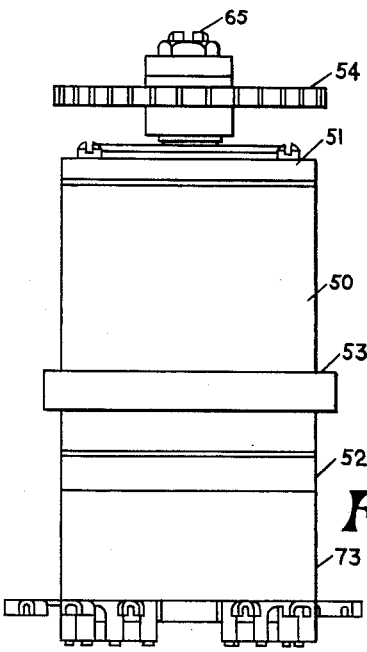
Fig. 2 is an elevation of the electromechanical resolver indicated in Fig. 1.
Figure 6:
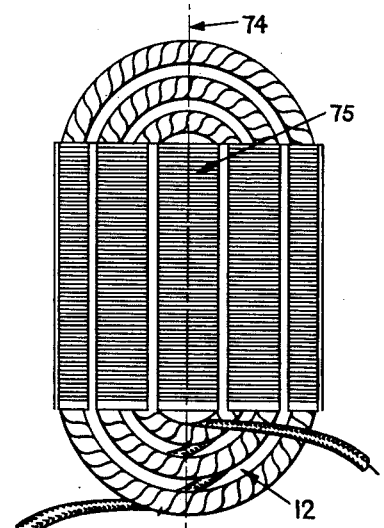
Figure 3:
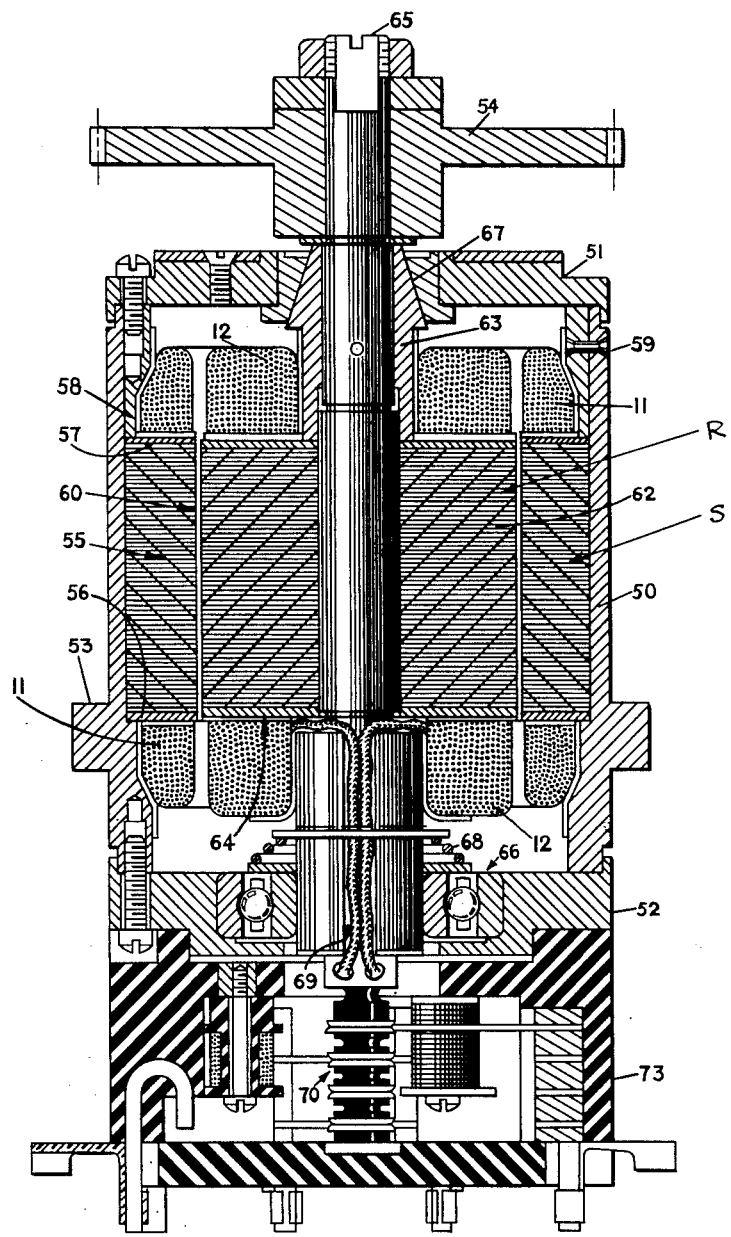
Fig. 3 is an enlarged axial section through the resolver of Fig. 2 showing the preferred internal construction.

Inasmuch as the resolver 10 used has iron cores of the type shown in Figs. 2 and 3, it is evident that circuits of high reactance must be considered, in that such reactances cause phase shift through the resolver and therefore loss of the one-to-one ratio. This loss of ratio is not constant but varies with the permeability of the core material and cannot be compensated by a simple phase-shift correction, such as could be used for any given combination of frequency and field strength. Therefore the compensator is provided which is so proportioned to the circuit of the resolver 10 as to act automatically with change in frequency and current in the system to correct instantaneously any changes, so that the ratio is kept at one-to-one at all times, within a very small margin of error.

The compensator includes a transformer 29 having a laminated core 30, a primary winding 31 and a secondary winding 34, and resistors 32 and 33, and all proportioned to accurately electrically simulate the proportions of the resolver 10. Impedance 33 is connected in series with the stator winding 11 of resolver 10, so that the same current flows in both of them. Resistor 32 is connected in series with primary winding 31 of transformer 29, and this series circuit is bridged across impedance 33. Thus, the phase and current changes in the resolver 10 are duplicated in the compensator, so that the compensator measures the phase distortion occurring momentarily in the resolver 10 and repeats the measurement to its secondary coil 34, which is inserted in the grid supply circuit from the input terminal 14. By this means, a correction for such phase distortion is entered into the amplifier 18.

Impedance 33 produces a voltage drop proportional to the voltage drop due to the flux leakage and wire resistance in the primary winding of the resolver. (The voltage drop due to the flux leakage and wire resistance in the primary winding of the resolver is the principal cause of error in the resolver.) Thus, impedance 33 serves to measure the loss in the primary winding of the resolver. Transformer 29 steps up the voltage drop in impedance 33, and also isolates the input and output circuits of the compensator. Voltage step-up by transformer 29 is necessary since the loss in impedance 33 is added to the loss in the primary winding of the resolver. The output voltage of transformer 29 is added in series with the input voltage impressed on terminals 14 and 15, and this added voltage from transformer 29 exactly compensates for the losses in both the primary winding of the resolver and impedance 33. Resistor 32 is provided to preserve the stability of the amplifier, by avoiding too high auxiliary feed-back at low frequency.

The effect of heating of the resolver 10 is also compensated by similar heating of the compensator and, where greater accuracy is required, the resistances 32 and 33 may be made of copper. Since the overall effect of all the errors abovementioned is a loss in ratio in the resolver 10, the various correcting means of the invention act to increase or decrease momentarily the gain of the amplifier 18. In this way, the accuracy of the calculations of the resolver is assured under all conditions of operation.

The operation of the electromagnetic or electromechanical calculating system illustrated by Fig. 1 will be readily understood from the foredescription of construction and operation of its component parts. From this description, it will be observed that the output voltage modulation on terminals 19 and 20 is an exact one-to-one instantaneous copy of the product of the amplitude of the input voltage applied at the terminals 14, 15 and the sine of angle A with the added practical advantage that a low impedance circuit is provided at terminals 19, 20, for operating a power amplifier and servo-motor, for example, without affecting the accuracy of the calculations. Furthermore, the input voltage applied to the terminals 14 and 15 may be from a high-impedance source without any tendency to load the source.

Figure 4:
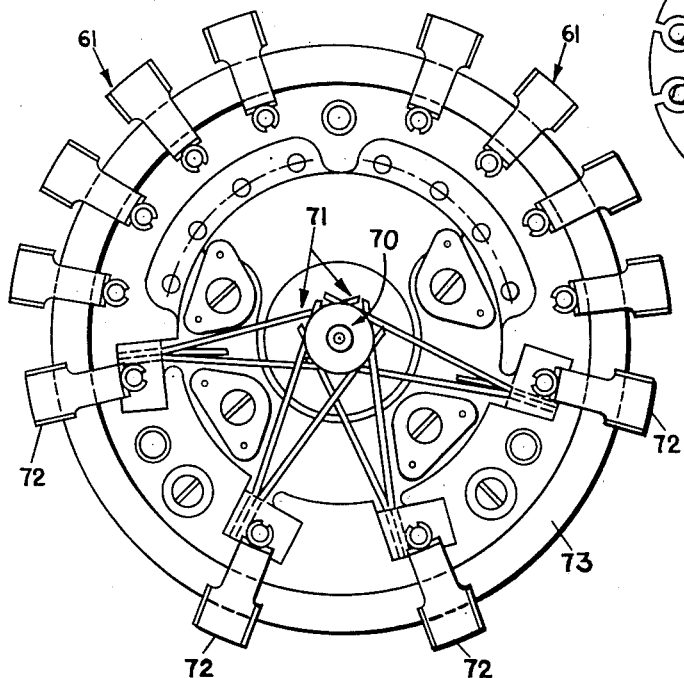
Fig. 4 is an end view of the resolver showing the brushes, terminals and adjusting resistors.

The novel construction of the precision high-efficiency, shockproof resolver unit of this invention used at 10 in Fig. 1 is illustrated in Figs. 2, 3 and 4 and comprises a soft steel tubular shell 50 with soft steel endcaps 51 and 52, the shell having an integral mounting ring 53, by means of which it may be mounted in any convenient angular position for meshing of its driving gear 54 with the mating gear, not shown.

Within the shell 50 is firmly mounted the precision stator assembly S, which includes a stack 55 of thin, electrically-isolated laminations made of high-permeability, high-resistivity, low-hysteresis loss, low eddy-current-loss, dead-soft, fine magnetic high nickel-steel alloy. This stack 55 is not a unit assembly but is assembled into the shell 50 one lamination at a time, beginning with the end plate 56, there being no rivets or screws through the laminations to distort the precision magnetic field therein. When the stack is completed, the other end plate 57 is placed in position and the whole stack forced down by a press applied to the inserted strong soft steel ring 58, which is permanently secured immovably in position in the shell 50 by means of rivets 59, for instance. The end plates 56 and 57 are chosen to have stiffness which the laminations of stack 55 lack in order to prevent distortion of the lamination stack and yet are composed of materials having low permeability and high resistivity, the same thermal coefficient of expansion as the stack 55 and non-magnetic. For this reason, non-magnetic steel is used, since other metals do not combine all these features. The inner surface 60 of the stack 55 is accurately concentric with the shell 50 and the windings 11 are then wound into position and leads brought out to the terminals 61, shown in Fig. 4.

The cooperating rotor R comprises a similar stack 62 of laminations clamped between endplates under pressure between the pinned collar 63 and the shoulder 64 on the extra large spindle 65, which is mounted for precision rotation in the ball bearing 66 and the ground cone bearing 67 mounted firmly in the end plates 52 and 51, respectively, under some pressure from spring 68. Windings 12 are inserted in the slots in the rotor stack 62 and the ends brought out in slots 69 to the slip rings 70 where special brushes 71 make connection to terminals 72, which with the other terminals, are mounted in the insulating cap 73 secured to the main shell 50 by screws, not shown.

The rotor R has a pair of windings, one winding at right angles to the other, and the stator likewise has right-angled multiple windings, i. e. multiplications of the single winding 11 of the resolver 10 shown in Fig. 1. Multiple windings are preferred because the action of most resolvers in gun-fire calculation involves more than one trigonometric solution in one resolver unit.

Figure 5:
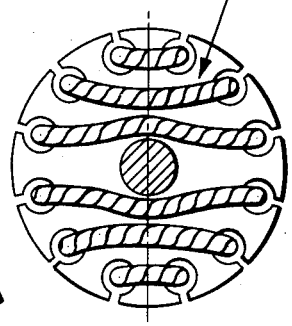
Fig. 5 illustrates diagrammatically the arrangement of windings of the rotor of the resolver shown in Fig. 3; and, Fig. 6 is an axial section of the same.

Inasmuch as one purpose of the resolver 10 is to calculate accurate sines and cosines of the angle entered on gear 54, multiplied by the value of the voltage fed to the stator coils, it follows that the magnetic field produced by the coils must be very precisely orientated around the center of the shaft 65. For this reason the windings 11 and 12 are made in a special manner as illustrated in Fig 5. Although this type of winding is frequently used in split-phase motor windings, its use in the resolver of this invention produces an entirely different and unexpected result, as was determined by long and exhaustive tests. Thus, it has been found that in a device of this kind, when lap wound, an angular factor enters into the calculations in that changes of current value flowing in a winding not only expectedly changes the strength of the field produced thereby, but also causes an angular shift of the field around the center of the resolver, which results in a direct angular error in the calculations. In other words, whereas with a given current in an ordinary winding of the lap type the median line of the field corresponds with the median line of the pole piece but shifts to a different position parallel to the pole median with each different value of coil current, the concentric windings 12 shown in Fig. 5 produce a field whose median line corresponds to the median line 74 of the pole piece 75, but there is substantially no shift of the median line of the field away from the line 74, with subsequent change of current flow in the winding 12. This assures the accurate trigonometric effects essential in precision calculation.

Although only one winding 12 composed of six coils is shown, it will be understood that a second winding may be added in the same slots at right angles to the one shown. With the assembly described, it is evident that the resolver will be unaffected mechanically by temperature changes or shocks and will give accurate trigonometric output modulations for angle and radius input in vector solutions such as used in gun-fire calculations, for instance.

Although certain preferred embodiments of the invention have been illustrated and described herein, it is to be understood that the invention is not limited thereby, but is susceptible of changes in form and detail within the scope of the appended claims.

We claim:

1. In an electromechanical calculating system, the combination of a stator winding, a rotor winding movable angularly relatively thereto, a source of alternating voltage, amplifier means having input terminals connected to said source and output terminals connected to one of said windings, voltage divider means connected to receive the output of said amplifier means, feedback connection means connected to a point on said voltage divider means and to the input circuit of said amplifier means, said feed-back connection means being adjusted to provide substantially one hundred percent degenerative feedback for said amplifier means, a resistance having a high temperature coefficient of resistance connected in the output circuit of said amplifier means in series with said one winding for developing a signal that is a function of the reactive and resistive loss in said one winding, a transformer having a primary winding connected to said resistor and a secondary winding connected in the input circuit of said amplifier means, a stabilizing resistor connected in series with said transformer primary winding, and output connections from the other of said windings.

2. In an electromechanical calculating system, the combination of an induction resolver including a stator winding having a magnetically permeable core and a rotor winding having a magnetically permeable core and movable relatively to said stator winding, said resolver having resistive and reactive properties that vary as a function of the amplitude and frequency of an input signal to one of said windings, thereby introducing an undesired phase shift between the output from the other of said windings and said input, amplifier means having output terminals connected to said one winding and having input terminals adapted to receive a signal from an alternating current source, said amplifier means utilizing substantially 100% degenerative feedback so as to have a substantially one-to-one ratio between output and input, phase shift compensating means connected in the output circuit of said amplifier means for energization by said resolver input signal, said compensating means having resistive and reactive properties that vary with the amplitude and frequency of said resolver input signal in substantially the same manner as the corresponding properties of said resolver to produce a correction signal, and circuit means coupling said compensating means to the input of said amplifier means for introducing said correction signal into the latter to effect compensation for said undesired phase shift in said resolver.

3. An electromechanical calculating system as described in claim 2 in which the phase shift compensating means is exposed to the same temperature as the induction resolver and the resistive properties of the phase shift compensating means also vary with ambient temperature so as to compensate for temperature effects.

GEORGE AGINS.
CHARLES D. BOCK.

References Cited in the file of this patent

UNITED STATES PATENTS

| Number | Name | Date |
|---|---|---|
| 1,564,788 | Hildebrand | Dec. 8, 1925 |
| 1,612,117 | Hewlett | Dec. 23, 1926 |
| 1,695,051 | Marrison | Dec. 11, 1928 |
| 1,829,901 | Jones | Nov. 3, 1931 |
| 1,929,431 | Hyland | Oct. 10, 1933 |
| 2,084,899 | Edwards | June 22, 1937 |
| 2,129,890 | Trucksess | Sept. 13, 1938 |
| 2,284,612 | Green | May 26, 1942 |
| 2,351,353 | McCarty | June 13, 1944 |
| 2,356,186 | Somers | Aug. 22, 1944 |
| 2,402,359 | Bedford | June 18, 1946 |
| 2,429,124 | Cunningham | Oct. 14, 1947 |
| 2,570,015 | Van Loon et al. | Oct. 2, 1951 |

FOREIGN PATENTS

| Number | Country | Date |
|---|---|---|
| 506,370 | Germany | Aug. 21, 1930 |